July 10, 1945. C. E. GERMAIN 2,380,162
SNOW RUNNER FOR BABY CARRIAGES
Filed Dec. 17, 1943
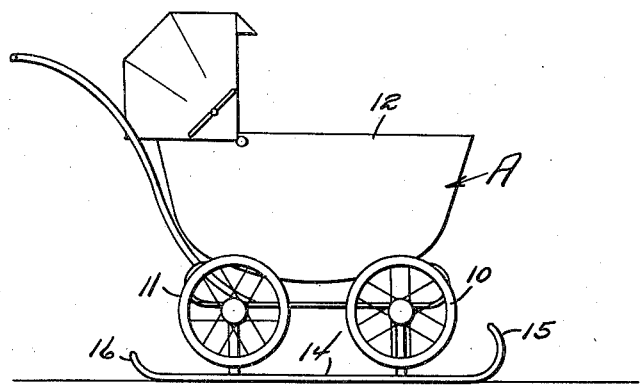
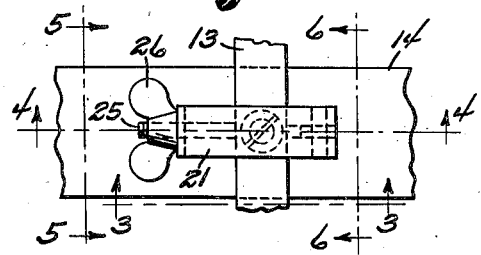
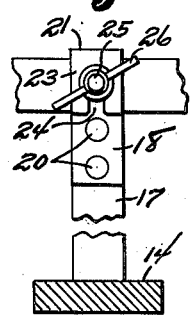
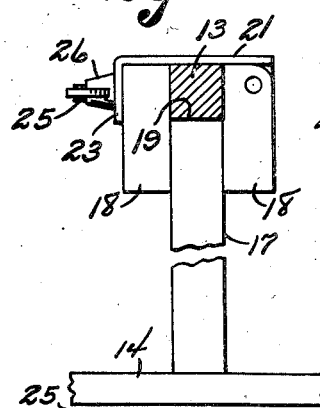
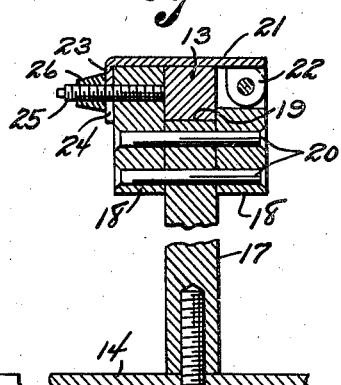
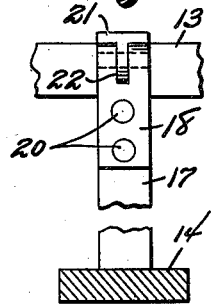
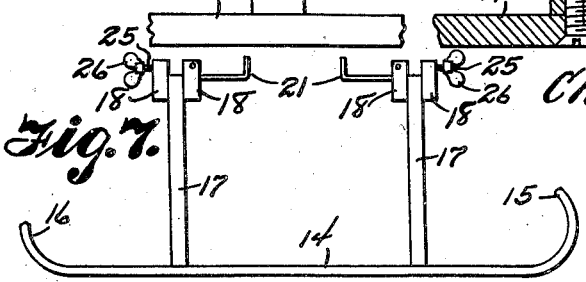
Charles E. Germain
INVENTOR.
BY
Victor J. Evans & Co.
ATTORNEYS Patented July 10, 1945

2,380,162

UNITED STATES PATENT OFFICE 2,380,162

SNOW RUNNER FOR BABY CARRIAGES

Charles E. Germain, Worcester, Mass.

Application December 17, 1943, Serial No. 514,713

1 Claim. (Cl. 280—8)

The invention relates to a baby carriage attachment and more particularly to snow runners for baby carriages or the like.

The primary object of the invention is the provision of runners of this character, wherein through the use of special clamps the upstanding legs or uprights to the runners can be firmly and securely removably fitted to the axles of the carriage or the like, thereby converting the wheeled vehicle into a sled, so that such carriage or the like can be used on a snow or sleet or ice covered surface.

Another object of the invention is the provision of runners of this character, wherein the fitting and removal thereof can be had with dispatch, requiring no special tools for such operations, and without undue exertion on the part of a user.

A further object of the invention is the provision of runners of this character, wherein the same can be adjusted to the proper position on the axles of the vehicle and will firmly support the latter while in use with safety to an occupant.

A still further object of the invention is the provision of runners of this character, which are simple in construction, thoroughly reliable and effective in purpose, strong, durable, readily and easily applied and removed, conveniently set, not detracting from the appearance of the vehicle, and inexpensive to manufacture and install.

With these and other objects in view the invention consists in the features of construction, combination and arrangement of parts as will be hereinafter more fully described, illustrated in the accompanying drawing, which shows the preferred embodiment of the invention and pointed out in the claim hereunto apended.

In the accompanying drawing:

Figure 1 is a side view of a baby carriage showing the runners constructed in accordance with the invention applied thereto.

Figure 2 is a fragmentary top plan view of one of the runners.

Figure 3 is a sectional view taken on the line 3—3 of Figure 2 looking in the direction of the arrows.

Figure 4 is a sectional view taken on the line 4—4 of Figure 2 looking in the direction of the arrows.

Figure 5 is a sectional view taken on the line 5—5 of Figure 2 looking in the direction of the arrows.

Figure 6 is a sectional view taken on the line 6—6 of Figure 2 looking in the direction of the arrows.

Figure 7 is a side view of a runner detached from the vehicle.

Similar reference characters indicate corresponding parts throughout the several views in the drawing.

Referring to the drawing in detail A designates generally a baby carriage of standard construction, having the front and rear wheel 10 and 11, respectively, supporting its body 12, as usual. Each wheel 10 and 11 is journaled on an axle, only a portion thereof being shown at 13 in Figures 2, 3 and 4, of the drawing.

Adapted to be secured to the fore and aft axles for the wheels 10 and 11, respectively, are snow runners, constituting the present invention, and each comprises a tread blade 14, having the upwardly curled front and rear ends 15 and 16, respectively.

Each blade 14 has bolted or otherwise secured thereto vertical legs or uprights 17, of the required height to elevate the wheels 10 and 11 from contact with the ground when the runners are applied to the vehicle A. At the upper end of each upright or leg 17 are a pair of blocks 18, these being fixed to opposite faces of the leg or upright on the sides thereof directed forwardly and rearwardly of the same, to provide therebetween a seat 19 for the axle 13, the said seat 19 being shaped correspondingly to the cross section of such axle, so that the leg or upright will not turn thereon.

The blocks 18 are held in place by cross fasteners 20, which pass transversely therethrough and also transversely through the leg 17 and the seat 19 being in longitudinal alignment with the leg or upright.

Hinged to one of the blocks 18 is a vertically swinging retaining latch 21, the hinge being denoted at 22, and this latch 21 is provided with a downturned terminal ear 23, having a bifurcation or slot 24 therein for accommodating a screw 25 threaded in the other block 18, the screw being fitted with a winged nut 26 for binding engagement with the ear 23 when the latch is in a closed position with relation to the seat 19, and with the axle 13 in the block the runner is securely fastened thereto. The latch is shown in closed securing position in Figures 3 and 4 of the drawing, while in Figure 7, each latch is shown in open releasing position.

A pair of the runners heretofore described are secured in place on the two fore and aft axles of the vehicle, so that the latter can be manipulated over a snow covered surface, with the wheels of such vehicle elevated and in inactive position.

What is claimed is:

A detachable clamp for holding the standards of sled runners on the axles of a baby carriage of the type having wheels and square axles from which the sled runners are supported, comprising a pair of parallel, spaced blocks fixed on each side of the sled runner standards and extending upwardly to engage the axle fore and aft, a plate hingedly connected to one block and extending across the tops of the blocks over and in contact with the top of the axle, a downturned slotted ear on the hinged plate, and a screw and nut carried by the other block to engage in the slot to clamp the plate in locking engagement with respect to the axle.

CHARLES E. GERMAIN.